Figure 1:
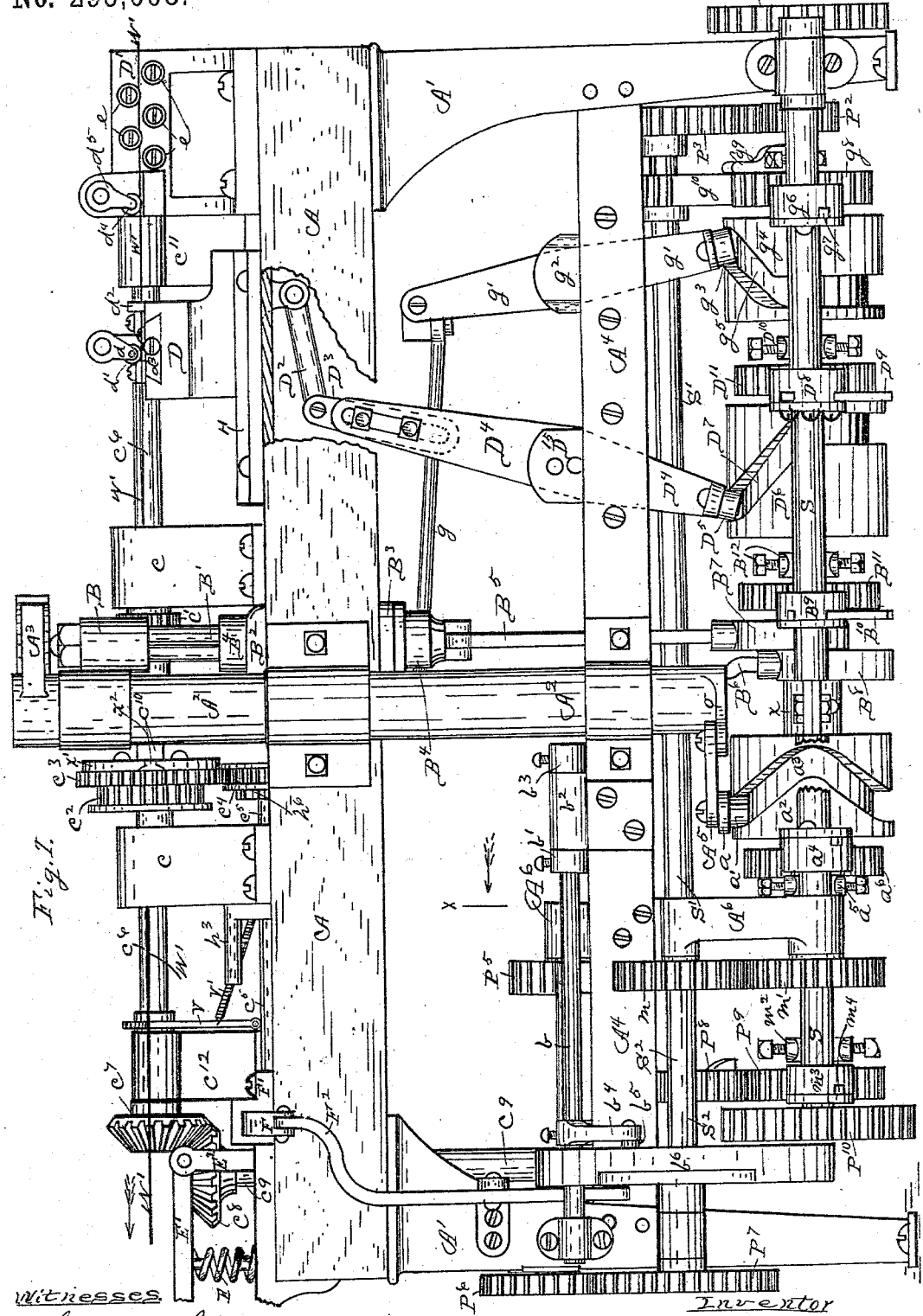

(No Model.)

7 Sheets—Sheet 1.

J. S. STEPHEN.
MACHINE FOR MAKING BARB WIRE.

No. 295,068. Patented Mar. 11, 1884.

Witnesses
Thos. H. Hutchins
Wm. J. Hutchins

Inventor
Joseph S. Stephen

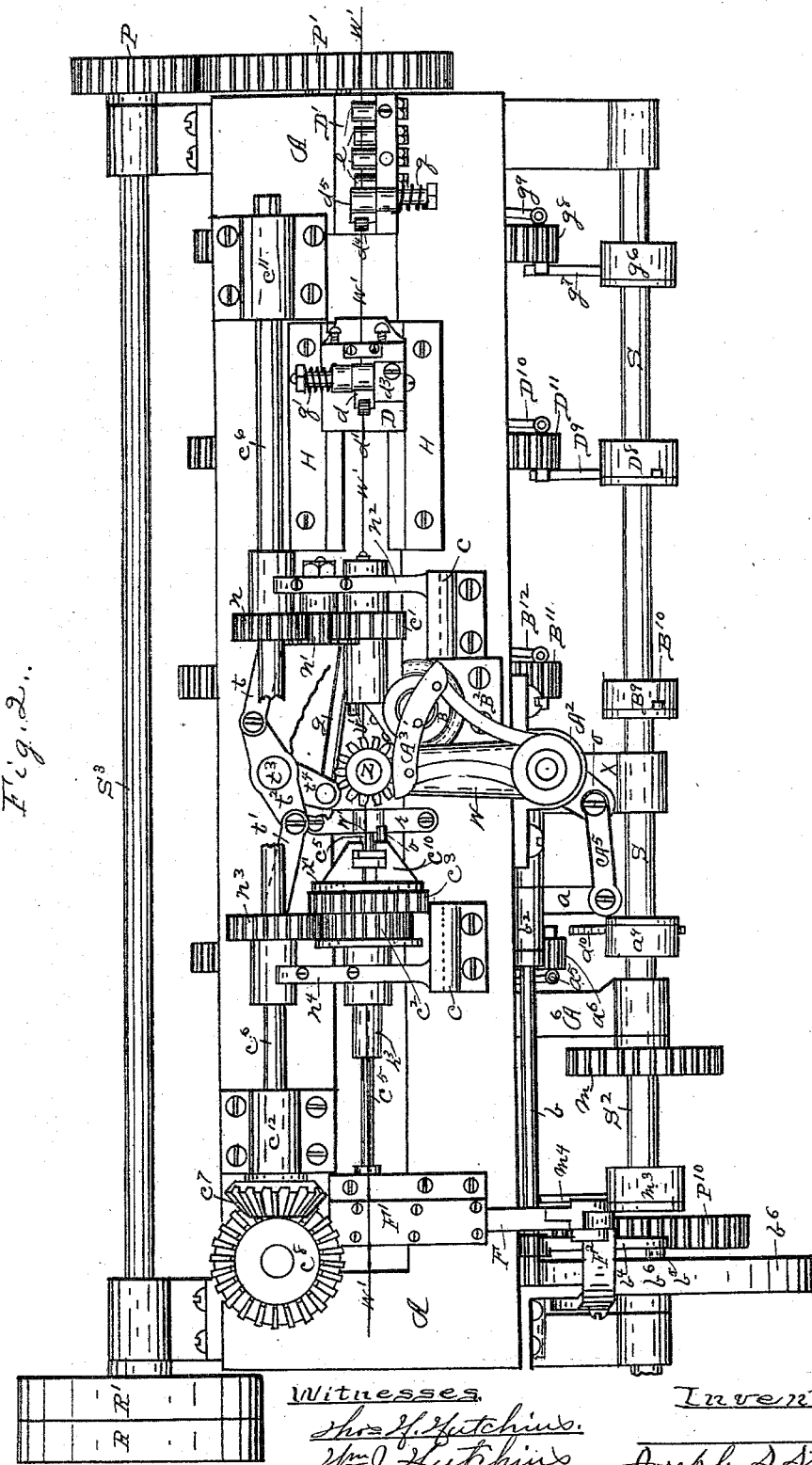

(No Model.) 7 Sheets—Sheet 3.
J. S. STEPHEN.
MACHINE FOR MAKING BARB WIRE.
No. 295,068. Patented Mar. 11, 1884.
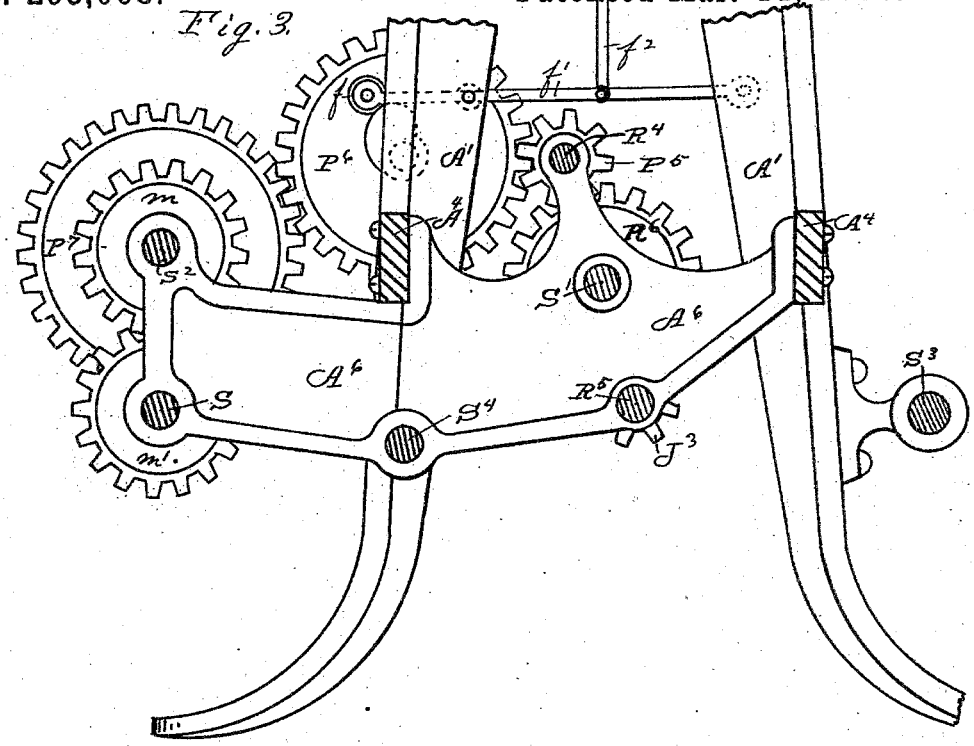
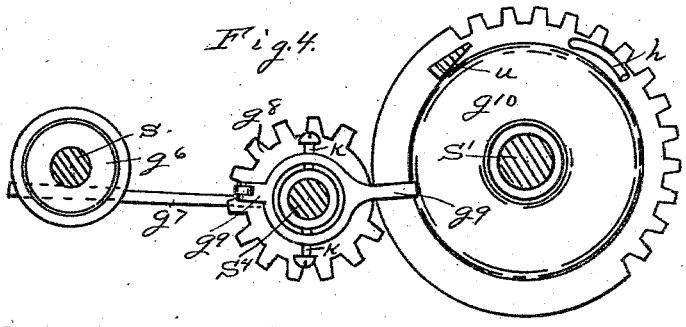
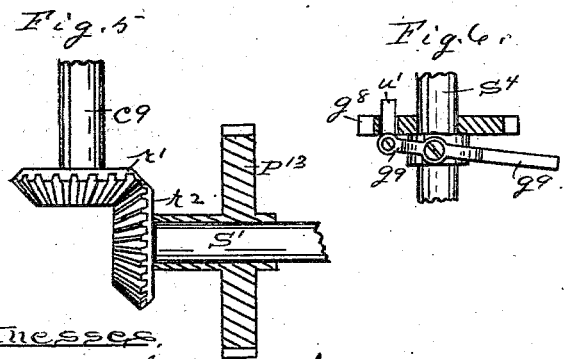
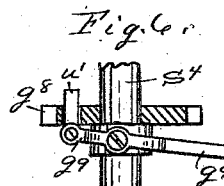
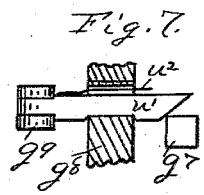
Witnesses
Thos H Hutchins
Wm J Hutchins
Inventor
Joseph S Stephen (No Model.) 7 Sheets—Sheet 4.
J. S. STEPHEN.
MACHINE FOR MAKING BARB WIRE.
No. 295,068. Patented Mar. 11, 1884.
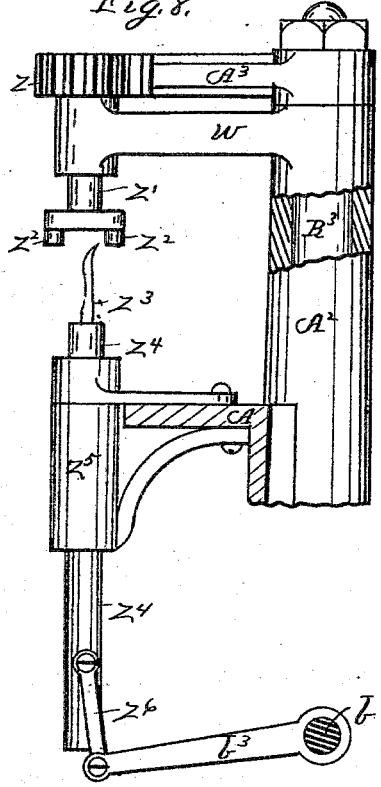
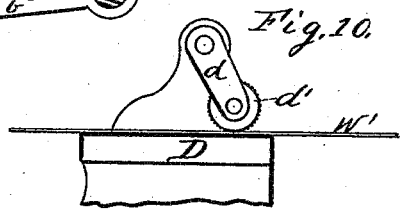
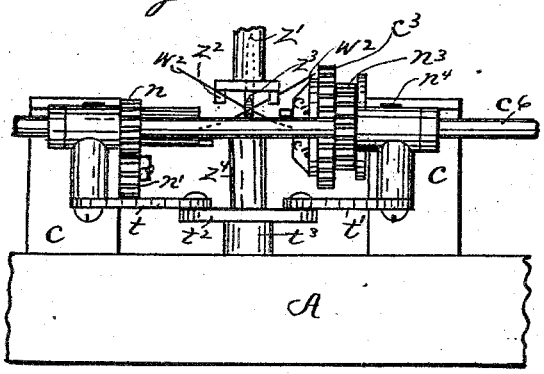
Witnesses
Thos. H. Hutchins.
Wm. J. Hutchins.
Inventor:
Joseph S. Stephen (No Model.) 7 Sheets—Sheet 5.
J. S. STEPHEN.
MACHINE FOR MAKING BARB WIRE.
No. 295,068. Patented Mar. 11, 1884.
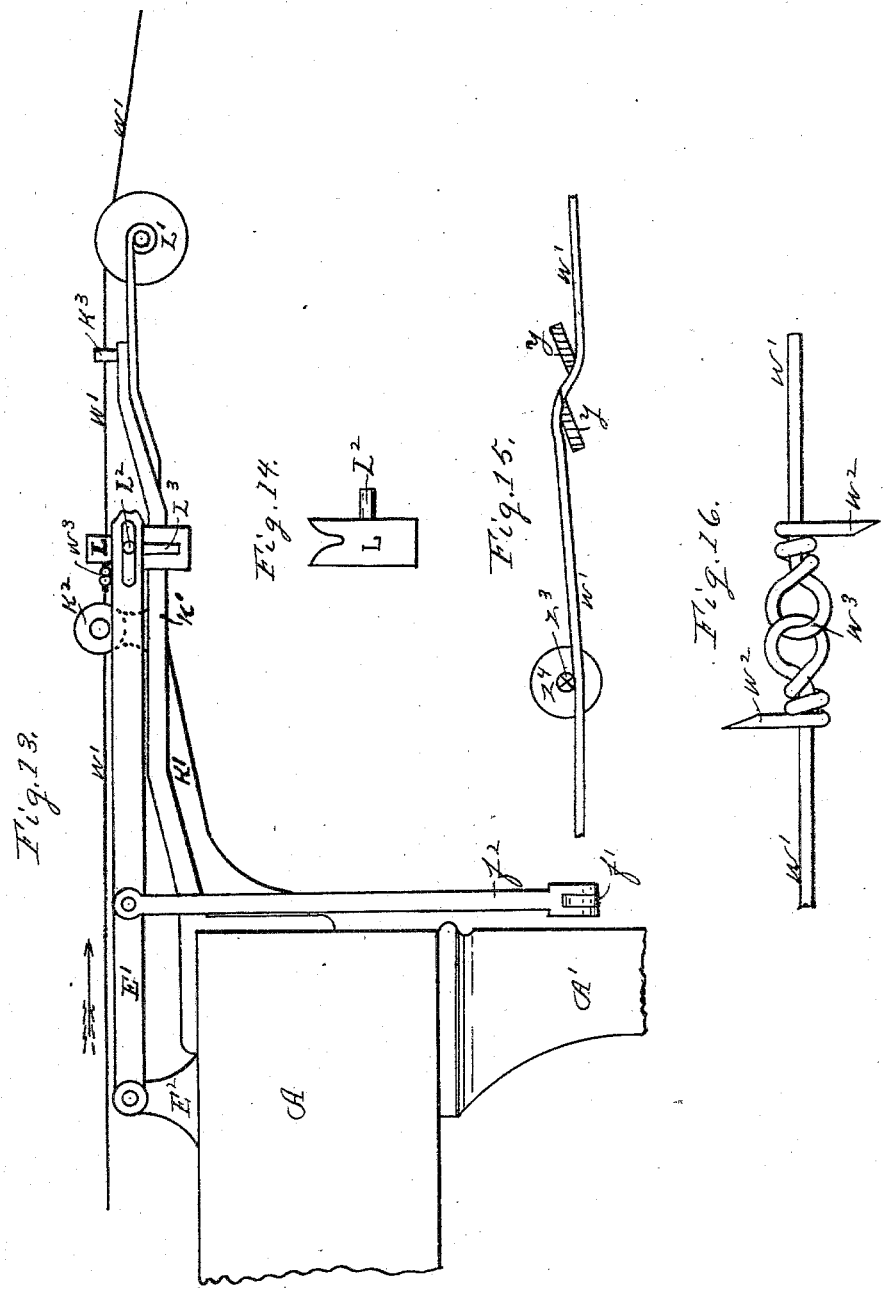
Witnesses
Thos H Hutchins
Wm J Hutchins
Inventor
Joseph S Stephen (No Model.) 7 Sheets—Sheet 6.
J. S. STEPHEN.
MACHINE FOR MAKING BARB WIRE.
No. 295,068. Patented Mar. 11, 1884.
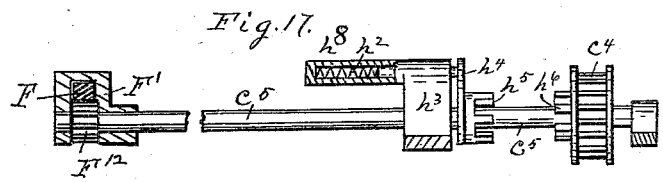
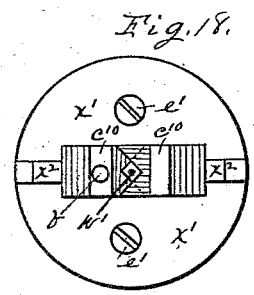
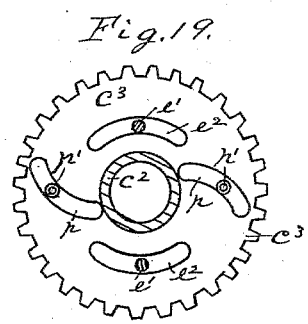
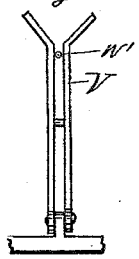
Witnesses.
Thos. H. Hutchins.
Wm. J. Hutchins.
Inventor.
Joseph S. Stephen.

(No Model.) 7 Sheets—Sheet 7.
J. S. STEPHEN.
MACHINE FOR MAKING BARB WIRE.
No. 295,068. Patented Mar. 11, 1884.
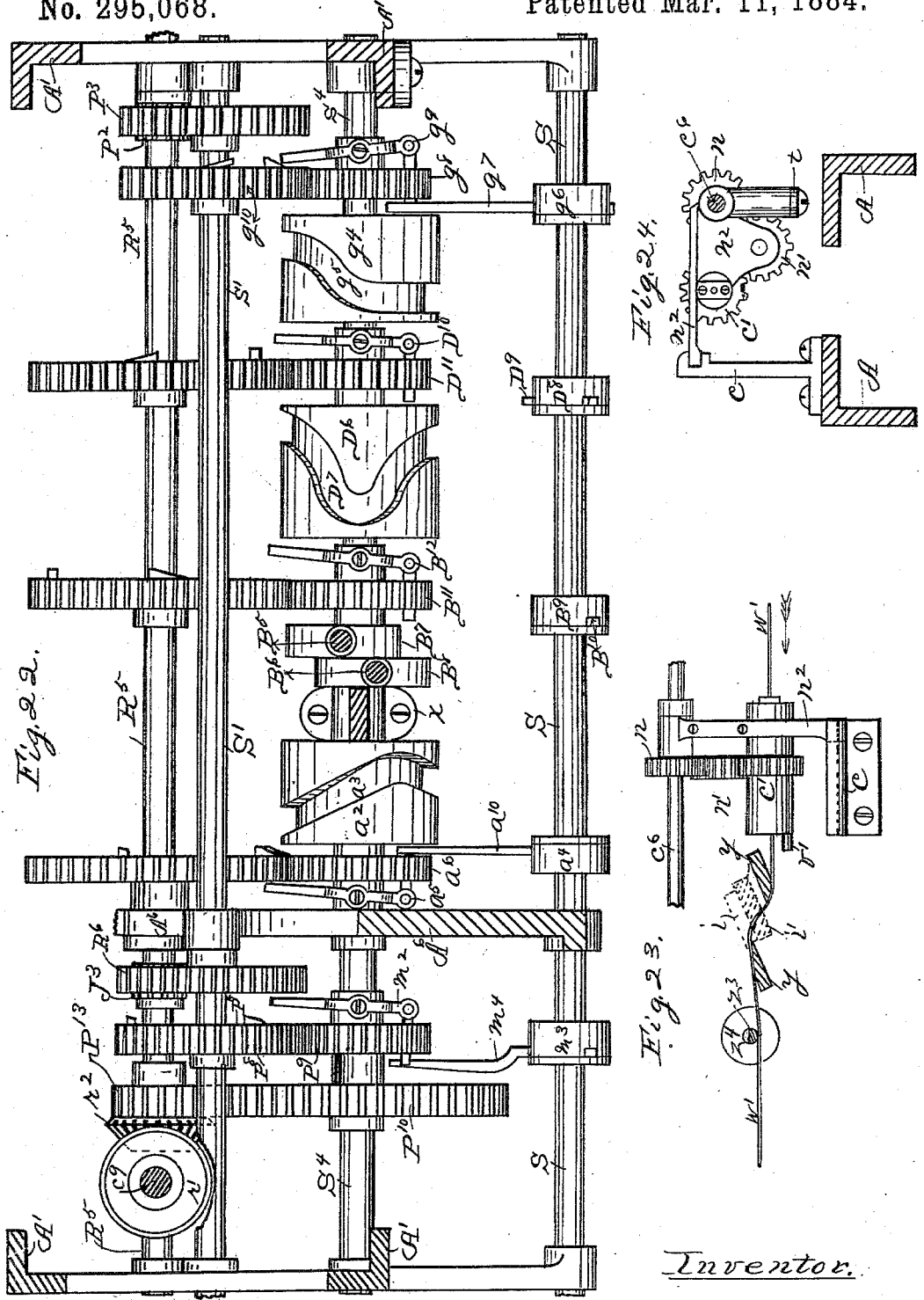
Witnesses.
Thos. J. Hutchins.
Wm. J. Hutchins.
Inventor.
Joseph S. Stephen.

UNITED STATES PATENT OFFICE.

JOSEPH S. STEPHEN, OF JOLIET, ILLINOIS.

MACHINE FOR MAKING BARB-WIRE.

SPECIFICATION forming part of Letters Patent No. 295,068, dated March 11, 1884.

Application filed September 4, 1883. (No model.)

*To all whom it may concern:*

Be it known that I, JOSEPH S. STEPHEN, a citizen of the United States of America, residing at Joliet, in the county of Will and State of Illinois, have invented certain new and useful Improvements in Machines for Making Barbed Wire, of which the following is a specification, reference being had therein to the accompanying drawings.

Figure 1 is a side elevation; Fig. 2, a plan view on the top; Fig. 3, a cross-sectional view of the lower portion of the machine, locating the shafting on line $x$, Fig. 1, looking to the left; Fig. 4, a side view of a single set of gears, arm $g^9$ and finger $g^7$ to throw them in gear; Fig. 5, a top view of the miter-gear connecting-shafts S' and $c^9$; Figs. 6 and 7, sectional views of Fig. 4, representing the finger $u'$; Fig. 8, a front view of the needle and the mechanism for operating it and for interlocking the two ends of the strand-wire, as shown in Fig. 16; Fig. 9, a similar view, showing the cutting-off device; Fig. 10, a side view of the feed; Fig. 11, a side view of the coiling-pinions, looking from the opposite side of Fig. 1, showing the mechanism by which they are reciprocated, and also the two cut-off ends of the strand-wire in position ready to be interlooped; Fig. 12, a top view on the two ends of the strand-wire after they have been interlocked; Fig. 13, a side view of the stop for stopping and holding the strand-wire so the barbs may be formed at regular intervals; Fig. 14, a front view of the stop L, which holds the strand-wire by engaging with a finished barb; Fig. 15, a top view, showing the wire with relation to the needle and the manner in which the wire is bent; Fig. 16, a perspective view of the finished barb, being the product of the machine; Fig. 17, a side view of the mechanism which opens and closes the jaws $c^{10}$; Fig. 18, a front view of the jaws $c^{10}$, and Fig. 19 a front view of the spur-wheel $c^3$; Fig. 20, a side view of the needle $z^3$, and Fig. 21 a front view of the guide V. Fig. 22 is a horizontal section of the machine above shaft S'. Fig. 23 is a top view, showing the wire $w'$ with relation to the needle and the manner in which the wire is bent, also a plan view on the top of sliding frame $n^2$, the coiling-pinion $c'$ and its operating-machine, and the position of the cutting-off dies $i$ and $i'$ indicated by dotted lines; Fig. 24, a rear elevation of the sliding frame $n^2$ and its attachments, being an end view of Fig. 23, looking from the right, and showing the manner in which it is supported by and arranged to reciprocate on frame $c$ and shaft $c^6$.

This invention relates to certain improvements in machines for the manufacture of barbed wire for fences, and it is of that class that forms the barbs by cutting the strand-wire into lengths and interlooping the cut-off ends together and coiling the cut-off ends back on the strand-wire in such manner as to leave them projecting in opposite directions to form barbs, as shown in Fig. 16.

Referring to the drawings, A represents the frame or bed of the machine, supported by legs A', said legs having cross-beams $A^4$, arranged to support a part of the lower portion of the machinery, as shown in Figs. 1 and 3.

R represents the drive-pulley, and R' a loose pulley on the drive-shaft $S^3$, and attached to the legs of the device by suitable boxes, and transmits motion to the working parts of the machine by means of the pinions P and P', as shown in Fig. 2. The pinion P' is attached to the shaft $R^5$, which extends nearly the whole length of the machine, and is provided on its inner end with the pinion $J^3$, which meshes into and operates pinions $R^6$ on the shaft S'. The shaft $R^5$ is also provided with another pinion, $P^2$, which meshes into and drives pinion $P^3$, also on shaft S', as shown in Fig. 1, for the purpose of dividing the strain of said shafts equally between each end.

$R^4$ is a short counter-shaft, and is provided with the pinion $P^5$, Fig. 3, one of which meshes into and receives motion from pinion $R^6$, and one of which drives pinion $P^6$, which is studded to one of the legs A' of the machine.

$S^2$ is also a short counter-shaft, and supports the pinions $P^7$ and $m$, which are keyed fast thereto. The pinion $P^7$ receives its motion from pinions $P^6$, and pinion $m$ drives pinion $m'$, which is keyed fast on the shaft S, as shown in Fig. 3, and also in Fig. 1. The shaft $S^4$ does not rotate, but supports a series of cog-wheels, cams, and eccentrics, as shown in Fig. 1, all of which are arranged in sets and placed loose on said shaft, while the shaft S supports a series of fingers, as shown at $g^7$ in Fig. 4, also in Fig. 1, which corresponds in number to the cams and eccentrics, or one finger for each set. Each set is so arranged as to be driven by a segment-gear, part of which is arranged on shaft S', while the remainder is arranged on shaft R⁵. Each independent set or combination of parts is so arranged as to operate an independent part of the machine in consecutive order in the formation of the barb, and as each set or combination is substantially alike, a description of one will answer for all, and so I will describe the set shown at the right in Figs. 1, 2, and 4. The gear-wheel $g^{10}$ has teeth on its periphery on about one-half of its circumference.

$g^8$ is a pinion having a portion of its teeth cut away. To the inner hub of said pinion is firmly attached cam $g^4$, Fig. 1, and to its outer hub is pivoted, by means of the pins or screws $k$, the arm $g^9$, so arranged that its long end may throw to and from the wheel $g^{10}$, while its short end terminates in the jointed finger $u'$, which passes through a hole in pinion $g^8$, and is held therein by means of a slight notch in its side and the pressure of the flat spring $u^2$, as also shown in Figs. 6 and 7. When the pinion $g^8$ is in the position shown in Fig. 4, the wheel $g^{10}$ can turn, and its teeth will pass by the pinion $g^8$ at the point where its teeth are cut away, and not rotate it; but as the shaft S turns, the finger $g^7$, which is held by the collar $g^6$, is brought up against the end of the finger $u'$, as shown in Figs. 4 and 7, and raises it, so as to uncatch it, and as the finger $g^7$ passes on up it bears against the inclined or beveled end of finger $u'$, which forces it back through the hole in pinion $g^8$ and swings the long end of arm $g^9$ around to the side of wheel $g^{10}$, and as the catch or lug $u$ on the side of wheel $g^{10}$ comes in contact with the arm $g^9$ it starts the pinion $g^8$ in motion far enough so that the teeth in the wheel $g^{10}$ and pinion $g^8$ will mesh together, when the pinion will be given one complete revolution, which will also give the same motion to the cam $g^4$. When it has completed such revolution, it is again in the position shown in Fig. 4, when the finger $h$ engages with the arm $g^9$ and returns it to the position shown in Fig. 6, ready to receive another similar motion in its proper turn. Each part of the machine dependent on the cams $a^2$ and $D^6$ operate in their proper turn in substantially the same manner.

At the right in Figs. 1 and 2, on the bed-plate A, is the standard or frame D', provided with the straightening-rollers $e$, between which rollers the wire $w'$ enters the machine, and also said frame is provided with the grip-roller $d^4$ on the arm $d^5$, to prevent the wire from drawing backward out of the machine. In front of said standard D' is arranged a sliding head, D, which reciprocates back and forth on the ways H by means of its attachment to the pitman $D^2$, arm $D^3$, and the arm $D^4$, which is pivoted to the stud $D^{15}$ on the frame $A^4$, as shown in Fig. 1. Said arm $D^4$ is provided on its lower end with the friction-roller $D^5$, to run in the channel $D^7$ of cam $D^6$, and receives its motion from cam $D^6$ as it rotates. To this sliding head D is attached the feed which feeds the strand-wire $w'$ into the machine, which feed consists of the milled roller $d'$, hung or pivoted on the lower end of the swinging arm $d$. The wire $w'$ lies between said roller and the head D, and a forward movement of the sliding head carries the wire forward as far as said head travels on account of the grip of said feed-roller on it, which is released as the sliding head moves backward. The upper end of swinging arm $d^5$ is provided with an integral stud extending at right angles with it out through the frame D', and terminates in a head. The coil-spring $g$ coils on said extended stud, as shown in Fig. 2, and has its outer end attached to said stud and its inner end to frame D', and is for the purpose of giving sufficient tension to hold the roller $d^4$ down to its work. Spring $g'$ is for the same purpose as spring $g$, and holds the feed-roller $d'$ on arm $d$ down to its work on the wire $w'$. The slide D is a head that traverses a pair of guideways, H H, one on either side, as shown in Fig. 2, by means of its attachment with oscillating arm $D^4$, as shown in Fig. 1, and as hereinbefore described, and is provided with a removable steel face-plate, $d^3$, on its upper surface to take the wear of the wire $w'$, which is compressed between said plate and feed-roller $d'$. Were it not for this plate $d^3$, the wire would soon wear out the upper surface of the slide D. This plate $d^3$ is held in position by a pair of set-screws, as shown in Fig. 2. Immediately in front of the ways H H, on which said sliding head travels, is the coiling-pinion $c'$, which is driven by the pinion $n$, feathered on the shaft $c^6$, and the intermediate pinion, $n'$. The hub of said coiling-pinion is provided on its outer end with the coiling-pin $v'$, the whole being supported on the frame $n^2$ and arranged to reciprocate on the rod $c^6$ and standard $c$. The opposite coiling-pinion, $c^2$, is driven by pinion $n^3$ on the rod or shaft $c^6$, and is supported on the frame $n^4$, which is arranged to reciprocate back and forth on shaft $c^6$ and standard $c$. The outer face of pinion $c^2$ is provided with the spur-wheel $c^3$, having the jaws $c^{10}$, the outer end of one of said jaws being provided with the coiling-pin $v$. Said jaws are arranged so they will open and close as they reciprocate, as will be more fully explained hereinafter.

The forward and backward motion of pinion $c'$ and frame $n^2$ and its attachments, and the backward and forward motion of pinion $c^2$ and frame $n^4$, with its attachments, are obtained by means of the rotation of cam $g^4$ in the manner following: As the said cam receives its motion as hereinbefore described, it oscillates the arm $g'$, which is pivoted to the stud $g^2$. The lower end of said arm $g'$ is provided with the friction-roller $g^3$, which travels in the cam-channel $g^5$ of cam $g^4$. The upper end of said arm $g'$ is connected by means of the pitman $g$ to the crank $t^4$ on the lower end of the short shaft $t^3$. The upper end of said shaft $t^3$ is provided with the double crank $t^2$. Said double crank $t^2$ is connected to the reciprocating frames $n^2$ and $n^4$ by means of the pitmen $t$ and $t'$. It is obvious from this connection that when cam $g^4$ rotates arm $g'$ will oscillate, and thereby reciprocate the frames $n^2$ and $n^4$, with the coiling-pinions, to and from each other for the purpose of reaching forward to coil the prods of the barbs back on the strand-wire and then recede. Before the barbs can be formed, the strand-wire $w'$ must be cut off diagonally to form sharp prods, and so the two cut-off ends may be looped together, as shown in Fig. 16. The cutting-off dies $i$ and $i'$ and the mechanism that operates them are shown in Figs. 9 and 23, and are located so that the said cutting-off dies stand immediately between the two coiling-pinions.

Looking at Fig. 9, A represents a section of the frame having the box $B^2$ attached to its upper surface and box $B^3$ attached to its lower surface. $B^4$ is a hollow shaft sleeved on the shaft $B'$, the two being respectively supported in said boxes $B^2$ and $B^3$. The hollow shaft $B^4$ is provided at one side with an upturned integral branch or arm, J, to support the lower cutting-off die, $i$. The upper end of shaft $B'$ is provided with the arm or head-block B, having the upper cutting-off die $i'$, and has also attached to its side the two downwardly-projecting fingers $y$ $y$. Reciprocating motion is given to the said two shafts bearing the said cutting-off dies by means of their connection with the two oppositely-set eccentrics $B^7$ $B^8$ on shaft $S^4$ and the eccentric-rods $B^5$ and $B^6$.

When the wire $w'$ is cut off, as set forth, the long end that is being fed into the machine must be fed forward, so that the two cut-off ends may pass each other for the purpose of looping them together, and lie in the form in relation to each other as shown in Fig. 11. The cut-off end is fed forward by the sliding head D and the feed-roller $d'$ as they reciprocate. Looking at Fig. 9, the wire $w'$ is represented as coming forward toward the observer. $i$ $i'$ are the cutting-off dies referred to. The head-block B on the upper end of the shaft $B'$, as before stated, supports the upper cutting-off die $i'$, and it also has attached to it a pair of fingers, $yy$. The wire, when it is fed through between the dies to be cut off, passes between these two fingers $y$ $y$, and when the die $i'$ descends it carries with it these fingers, which, in their descent, stride the wire $w'$, and at the instant it is cut off bend the cut-off ends of the wire in the form shown in Fig. 15, so as to turn the cut-off point to one side, so that when it receives its next feed forward it will be directed to the proper side of the needle $z^3$ that stands a little ahead, as is shown in said figure, and which needle and the parts that support and operate it are shown more in detail in Fig. 8, and located behind shaft $A^2$ looking at Fig. 1, and which will be explained more in detail hereinafter. As before stated, the wires are to have their cut-off ends interlocked, and I will now proceed to describe the particular part of the machine that performs that part of the work.

Referring to Figs. 8 and 1, A represents the frame and supports the hollow shaft or standard $A^2$. This standard contains the shaft $R^3$, sleeved therein and extending above it, so as to have attached to its upper end the toothed segment $A^3$, firmly keyed thereto, and which segment meshes with the pinion $z$ and rotates it first in one direction and then in the other. The pinion $z$ is firmly keyed to the shaft $z'$, which shaft $z'$ is supported in suitable boxing in the outer end of arm $w$, which is integral with the standard $A^2$. To the lower end of shaft $z'$ is attached a pair of coiling-pins, $z^2$. Immediately below the center of shaft $z'$ is a vertical reciprocating needle fixed in the shaft $z^4$, which reciprocates in box $z^5$ by means of the link $z^6$ and crank $b^3$ on rock-shaft $b$. The rocking motion is given to shaft $b$ by means of the crank $b^4$, Fig. 1, having a wrist-roller, $b^5$, that travels in the cam-channel on the face of cam-wheel $b^6$. By this connection with cam $b^6$ on shaft $S^2$, the needle $z^3$ is reciprocated up and down, and, when it is elevated to its highest point, runs up into the lower end of shaft $z'$, which is hollow to receive it, as shown in Fig. 11, for the purpose of holding it firmly while the prods $w^2$ $w^2$ shown in said Fig. 11 are being coiled around it by the revolution of the coiling-pins $z^2$ and left in the form shown in Fig. 12. The needle $z^3$ remains in the position shown in Fig. 11 until the prods of the barb $w^2$ are coiled back upon the strand $w'$, as shown in Fig. 16. The method of forming such a loop as shown in Fig. 16 is as follows: After the wire strand $w'$ has been cut and the cut-off end fed up, so that a cut-off end will lie one on either side of the needle $z^3$, as shown in Fig. 11, the needle is elevated so as to elevate the two ends of the wire high enough to place them between the coiling-pins $z^2$, so that the coiling-pins in their revolution may catch each a prod and wind each one around the needle, and so the two prods $w^2$ $w^2$ are looped or hooked together and left in the position shown in Fig. 12. At this instant the two coiling-pinions $c'$ $c^2$, through which the wire $w'$ passes on its way through the machine, move simultaneously toward each other up next to the needle $z^3$ between them, far enough so the coiling-pins $v$ and $v'$, Fig. 2, can, when the said coiling-pinions rotate in the manner described, each catch a prod, $w^2$, and coil them in opposite directions back upon the strand-wire, as shown in Fig. 16, forming a finished barb, as stated, after which the coiling-pinions $c'$ $c^2$ recede by means of their connection with the mechanism hereinbefore described, ready to perform another like operation. While the said two coiling-pinions $c'$ $c^2$ are so receding from the barb the machine is so adjusted that it will cause the needle $z^3$ to descend by means of its connection with cam $b^6$, as before described. The barb having thus been formed, it must pass on out of the machine, so the next barb can be formed in like manner. In order to accomplish this, the two jaws $c^{10}$ $c^{10}$ on the face of the coiling-pinion $c^2$ shown in Fig. 18 open so as to permit the barb to pass on through said pinion. The mechanism for opening and closing said jaws is illustrated in Figs. 1 and 17. After the coiling-pinion $c^2$ has coiled its prod, it, together with the spur-wheel $c^3$, which is integral with it, returns. The spur-wheel $c^3$ meshes with spur-wheel $c^4$ on the shaft $c^5$, which shaft is shown in Figs. 1, 2, and 17. Spur-wheel $c^4$ is loose and slides along on shaft $c^5$, or reciprocates therein by means of its connection with spur-wheel $c^3$. The teeth of pinion $c^3$ are held meshed with those of pinion $c^4$ by means of the raised sides of said pinion $c^4$, so that pinion $c^3$ can reciprocate pinion $c^4$ on shaft $c^5$, as is obvious by looking at Figs. 1 and 17. To the side of this wheel $c^4$ is attached a set of teeth, $h^6$, which, when pinion $c^4$ slides on the shaft $c^5$, mesh with the teeth on the side of the feathered pinion $h^5$, thus uniting or coupling the pinions $h^5$ and $c^4$ together, so that when shaft $c^5$ rotates it will rotate pinion $c^4$ with it so long as such coupling is maintained. The pinion $h^5$ is backed with a spring-plate, $h^4$, having a plunger to stand on the coil-spring $h^2$ in the barrel $h^8$, attached to box $h^3$, so as to prevent jar and cause the two coupling-pinions to more readily couple.
When the wheel $c^4$ is thus coupled with the pinion $h^5$, the shaft $c^5$ is caused to rotate by the cam $b^6$ by means of its connection thereto by the pinion $F^{12}$, sliding toothed rack F, and lever $F^2$, pivoted at about its center to the leg A'. As pinion $c^4$ thus rotates first in one direction and then in the other, it rotates spur-wheel $c^3$, which opens and closes the jaws $c^{10}$ in the following manner, and shown in Figs. 2, 18, and 19: The face of wheel $c^3$ is provided with a disk, $x'$, attached to the coiling-pinion $c^2$ by means of the screws $e'$ $e'$, passing through the wheel $c^3$ in the slots $e^2$, as shown in Fig. 19. To this disk $x'$ are attached the jaws $c^{10}$, arranged to slide to and from each other in the ways or slots $x^2$. To the rear of these jaws $c^{10}$ are attached the pins $p'$ $p'$, which extend into the eccentric slots $p$ $p$ in the wheel $c^3$. As the wheel $c^3$ is turned by wheel $c^4$ in either direction by the movement of cam $b^6$, the jaws $c^{10}$ open, so as to permit the finished barb to pass out and then close on the strand-wire $w'$, to hold it firm while another barb is being formed. When the pinions $c^4$ and $h^5$ are not connected, the pinion $c^4$ is free to rotate with wheel $c^3$, while the prods are being coiled back on the strand-wire $w'$, as described. The shaft $c^6$ is caused to rotate, when the two coiling-pinions $c'$ and $c^2$ reciprocate toward each other, by means of the miter-gear $c^7$ and $c^8$, (shown in Fig. 1,) and the miter-gears $r'$ and $r^2$ below, (shown in Fig. 5,) which are connected by the vertical shaft $c^9$. The miter-gear $r^2$ is integral with pinion $P^{13}$, and both are sleeved loosely on shaft S'. The pinion $P^{13}$ meshes into and is driven by pinion $P^{10}$, Fig. 1, which is integral with the pinion $P^9$ on shaft $S^4$. The pinion $P^9$ is driven by the partially-toothed wheel $P^8$, which is of the same combination and design as shown in Fig. 4, and is set in motion by the finger $m^4$, (shown in Figs. 1 and 2.) After a barb has been thus formed, the wire $w'$ must move on out of the machine, and the finished wire cut and formed in barbed loops, as shown in Fig. 16, wound upon a suitable spool, (not necessary to be shown or described.) The wire $w'$ travels out of the machine in the direction of the arrow, looking at Fig. 1, and from thence onto a continuation of the same machine, (shown in Fig. 13,) and, finally, to a spool, (not shown,) which may be rotated by frictional gearing, so the spool will rotate intermittently, as the wire is permitted to leave the machine. I do not show the spool or the mechanism for rotating it, as it is not necessary, and is no part of this invention.
Looking at Fig. 13, L represents a reciprocating stop having its upper end forked, as shown in Fig. 14. This stop L is reciprocated up and down by means of its attachment to the outer end of the lever E', the inner end of which is pivoted in the standard $E^2$. The lever E' is operated so as to reciprocate the stop L by means of the connecting-rod $f^2$ and lever $f'$. (Shown also in Fig. 3.) The lever $f'$ has its outer end provided with a roller-wrist that runs in a cam-channel on the side of pinion $P^6$, or on a cam on the shaft to which pinion $P^6$ is attached, as may be desired. It will be observed that by this connection said cam will reciprocate stop L. The object of reciprocating stop L is to elevate it to catch a barb as it passes along by means of the wire $w'$, drawing along in its fork until a barb strikes it, as shown in Fig. 13, and arrests the progress of the wire $w'$ until a new barb is formed, when the stop L lowers, by means of the mechanism described, so as to let go the barb it has just held, and the spool then draws the wire along until the stop L rises again just in time to catch and hold the next barb until another is formed, and so on until the whole wire is formed into loops having barbs, as shown in Fig. 16, at equal distances apart, for the purpose specified.
The needle $z^3$ is formed at its point as shown in Figs. 8 and 20. After the prods or cut-off ends of the wire $w'$ have been interlooped about the needle and the coilers have coiled them back about the strand-wire, the body of the strand-wire has been torsionally strained and given a tendency to rotate, and as the needle is withdrawn from the loop of a finished barb the curved or bent point of said needle will permit the loop to turn off the point without catching better than if the needle were straight, as the point of the needle is turned in the direction the loop is to turn off. The size of the needle determines the size of the loop. The side of the needle a little below the point is cut away or curved inwardly, as shown in Figs. 8 and 20. This curved or cut-away side of the needle is on the side the cut-off end of the strand-wire is fed in, so as to be small and out of the way, or one side, so the wire will not strike or rub against it. The needle is elevated, as shown in Fig. 11, before the interlooping is done, so the base or strong part will be next the strand-wires when the coiling is done to form a perfect pair of loops.

The guide V, Fig. 1, is located in front of the coiling-pinion $c^2$, and is flared at its top end for the purpose of receiving and guiding the finished barbed wire and directing it straight into the jaws $c^{10}$, so that they will not catch on the sides of the jaws, and as each barb strikes said guide it is thrown forward, and the barb passes over and out. A spring, V', at its base returns it again to its upright position for the purpose specified. The arm $D^4$, Fig. 1, is constructed so as to be lengthened or shortened by means of the extension $D^3$, forming a part of said arm, so as to give a longer or shorter stroke to feed in more or less wire, so the barbs can be formed any distance apart desired, as said lengthening or shortening of said arm will reciprocate the sliding head D, with its feed, to a greater or less distance.

This machine may be used for the manufacture of check-row wire for seed-planters by cutting the prods so short that they will not project like barbs.

I do not claim to have invented every part of this machine. What I have invented is particularly set forth in the claims.

Having thus described my invention, what I claim as new, and desire to secure by Letters Patent, is as follows, to wit:

1. The combination of the reciprocating head D, swinging arm $d$, spur-wheel feed $d'$, ways H H, pitman $D^2$, arms $D^3$ and $D^4$, friction-roller $D^5$, and cam $D^6$, all arranged to operate as and for the purpose set forth.

2. In the barbing-machine described, the oscillating arm $D^4$, having the extension $D^3$, in combination with the cam $D^6$ and reciprocating head D, carrying devices for feeding the wire, and pitman $D^2$, as and for the purpose set forth.

3. In the barbing-machine described, the fingers $y\ y$, in combination with the cutting-dies $i\ i'$, and the reciprocating sliding head D, and feed $d$ and $d'$, and means for operating the fingers and dies, as and for the purpose set forth.

4. In the barbing-machine described, the needle $z^3$, having its point curved in a direction at right angles with the strand-wire, and having its side immediately below said curve hollowed, as and for the purpose stated.

5. In the barbing-machine described, the needle $z^3$, having the form shown and described, in combination with the shafts $z^4\ z'$, coiling-pins $z^2\ z^2$, link $z^6$, crank $b^3$, rock-shaft $b$, crank $b^4$, and cam $b^6$, all arranged to operate as and for the purpose set forth.

6. In the barbing-machine described, the combination of the reciprocating head D, provided with a suitable grip-feed for feeding the wire into the machine, cutting-off dies $i\ i'$, bending-fingers $y\ y$, reciprocating needle $z^3$, coiling-pins $z^2\ z^2$, and the mechanism described for operating said several parts, as and for the purpose set forth.

7. In the barbing-machine described, the feed consisting of the spur wheel or roller $d'$, suspended in and in combination with the swinging arm $d$, as and for the purpose set forth.

JOSEPH S. STEPHEN.

Witnesses:
THOS. H. HUTCHINS,
WM. J. HUTCHINS.